E. M. DEANE.
Hay and Grain Elevator.
No. 226,985. Patented April 27, 1880.
3 Sheets—Sheet 2.
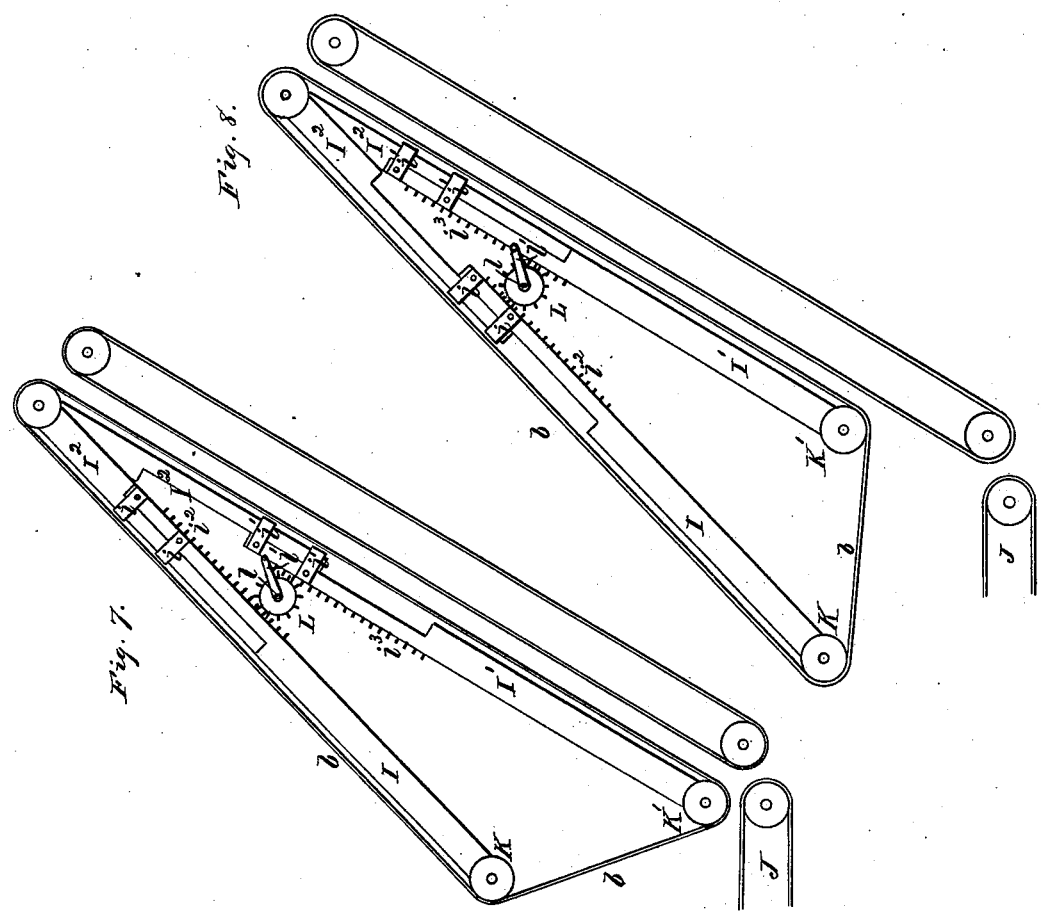

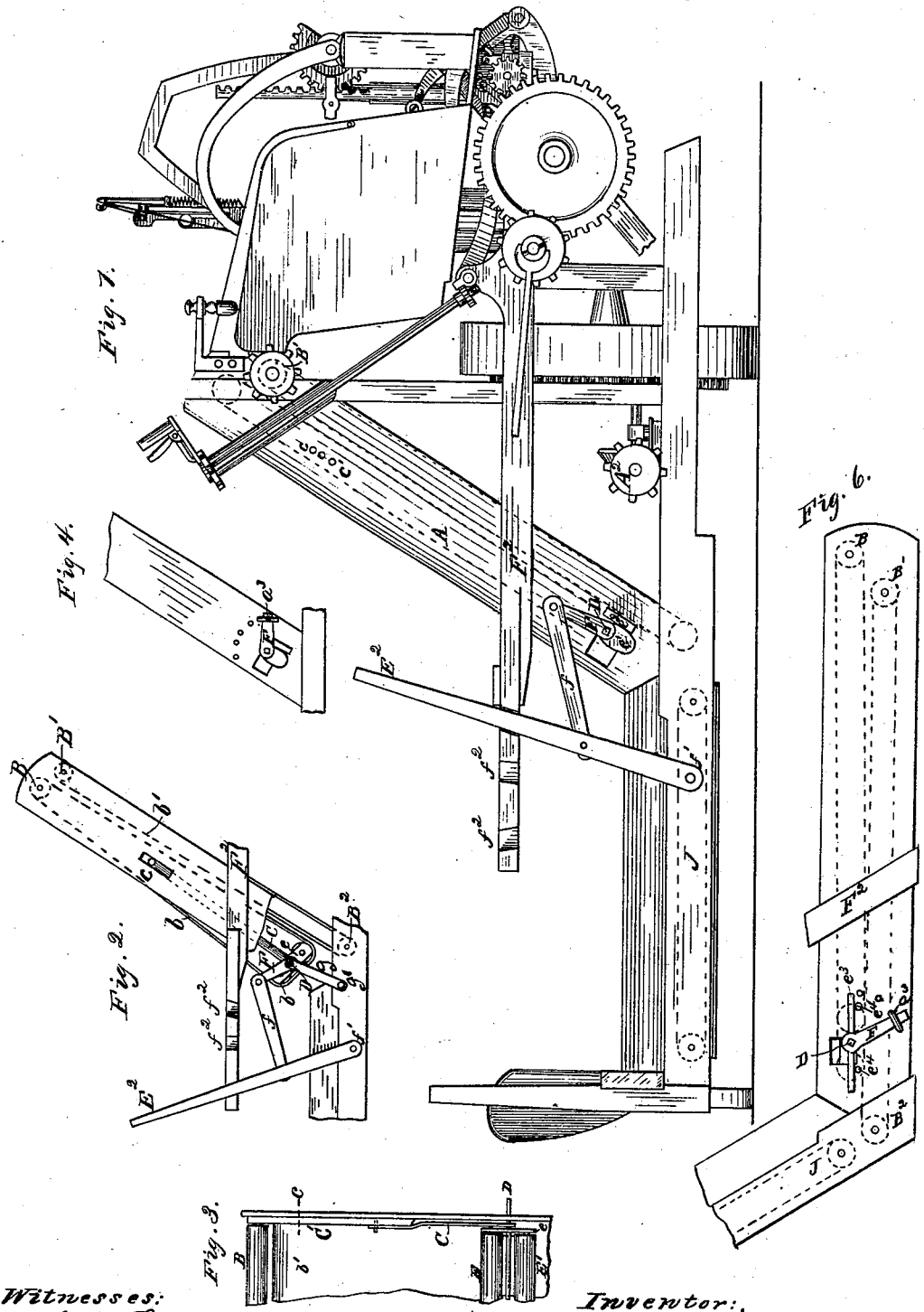

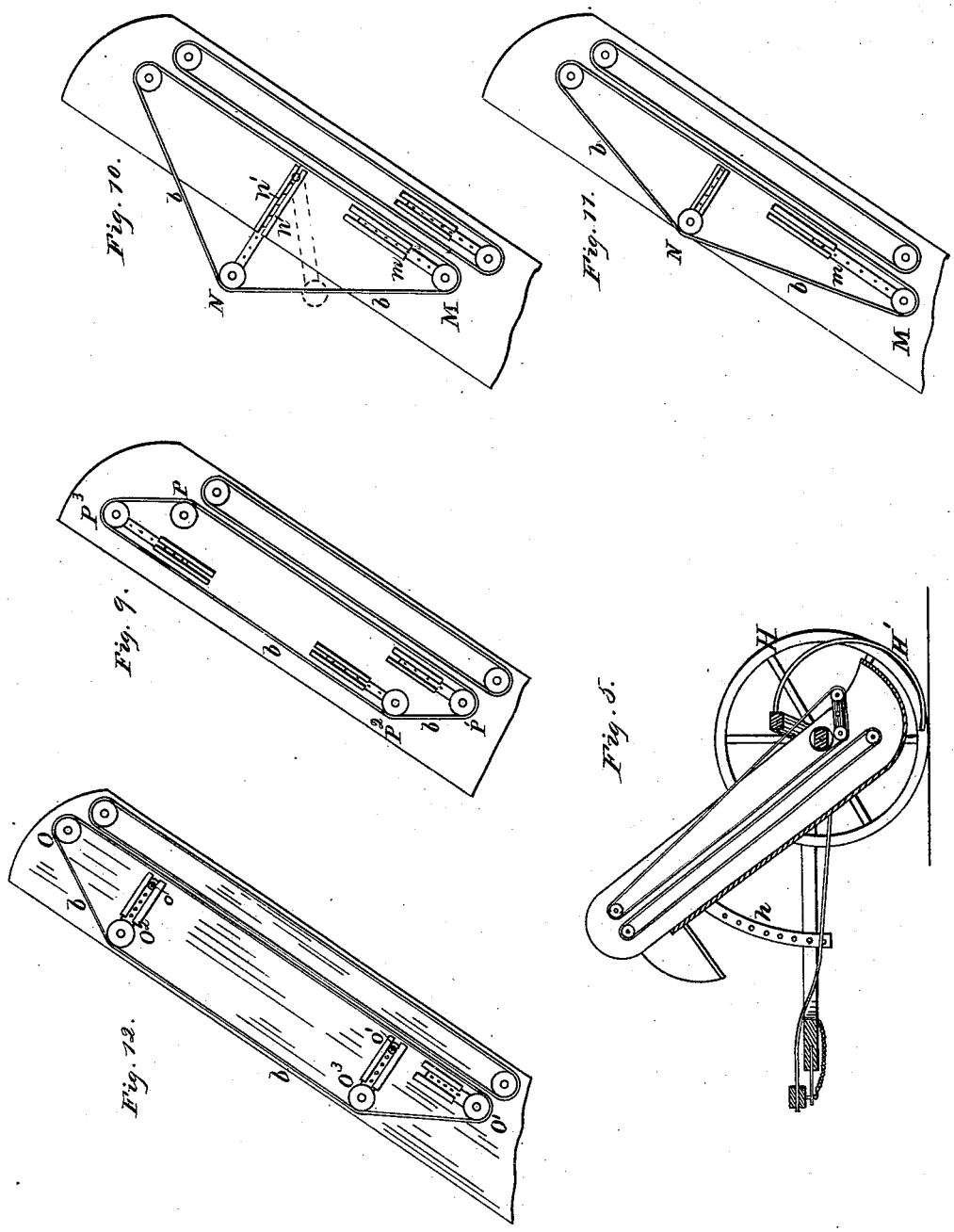

UNITED STATES PATENT OFFICE.

ERASMUS M. DEANE, OF ST. PAUL, MINNESOTA.

HAY AND GRAIN ELEVATOR.

SPECIFICATION forming part of Letters Patent No. 226,985, dated April 27, 1880.

Application filed September 20, 1879.

*To all whom it may concern:*

Be it known that I, ERASMUS M. DEANE, of St. Paul, in the county of Ramsey and State of Minnesota, have invented certain new and useful Improvements in Hay and Grain Elevators; and I do hereby declare that the following is a full, clear, and exact description of the invention, which will enable others skilled in the art to which it appertains to make and use the same, reference being had to the accompanying drawings, and to letters of reference marked thereon, which form a part of this specification.

In the harvesting of grain with that class of machines in which the grain is elevated over the main driving and carrying wheel it is sometimes necessary to elevate an unusually large mass of straw, which is deposited upon the horizontal carrier in rear of the cutting apparatus in bunches, especially when cutting lodged or tangled grain, and with machines as ordinarily constructed it is sometimes difficult to accomplish this, because of the narrowness of the throat or space of the lower end of the elevator, especially in that class of elevators which are sometimes called "duplex elevators," and consist of two substantially parallel endless belts mounted at top and bottom upon rollers extending across the elevator and journaled at its sides; so, also, in loading hay it is desirable to construct the elevator with a wide flaring mouth or throat to receive and compress the cut grass which has been collected in a comparatively loose mass by the teeth, or their equivalent, of a raking apparatus.

Figure 1 is a rear elevation of a harvester having my invention applied thereto. Fig. 2 is a detached view of the elevator with the throat widened, the side piece or frame being broken away to show the position of the belts. Fig. 3 is a front view of the arms and rollers which support the outer or upper elevator-belt. Fig. 4 is a detached view of a modification employed to keep the elevator properly spaced. Fig. 5 is a side elevation, showing my invention as I propose to use it for loading hay or grain which has been cut and left upon the ground either in windrows, swaths, or spread in a comparatively uniform layer over its surface. Figs. 6, 7, 8, 9, 10, 11, and 12 show modifications of my invention.

My invention is intended for use upon that class of harvesters in which the grain, after being cut, falls upon a carrier arranged in rear of the cutting apparatus, by means of which it is moved toward the main driving and supporting wheel until it is delivered to an elevator, which elevates it over said wheel and delivers it upon a chute-board.

I will not describe the machine in detail, but will confine myself to such parts as will illustrate the construction and operation of the invention herein claimed.

Referring to Figs. 1 and 2, A is one side board, upon which a duplex elevator is partially supported at the rear of the machine, there being a similar board at the front of the machine, and in this patent the words "upper edge of the elevator-frame," whenever used, indicate the upper inclined edge of these side boards.

Two rollers, B B', are journaled at the upper end of the elevator side boards. (See dotted lines.)

$B^2$ is a roller journaled in the lower ends of the side boards or their equivalent.

$b'$ is the inner or under endless belt, supported upon and driven by rollers B' $B^2$.

The upper rollers carry at one or both ends cogged gears, (not shown,) which mesh with each other, roller B' being driven from wheel $A^2$; or any other usual or approved and suitable mechanism may be employed for driving the endless belts.

C C' C C' are two bars or links pivoted near their upper ends to the inner walls of the elevator, as shown. Each bar is made in two pieces adjustably connected together, so that they can be lengthened or shortened for the purpose of increasing the tension upon the outer or upper belt; or each bar may be made in one piece, and its pivot adjusted in holes $c'$ to a point nearer to or farther from the roller B for the same purpose.

D is a rock-shaft journaled in the lower ends of the vibrating bars C C', with its ends projecting through the side boards or side piece, A, said side piece being slotted to permit a free movement of the rock-shaft both lengthwise of the elevator-frame and transversely thereto.

*e e* are rocker-arms mounted on rock-shaft D, just inside the bars C C'. E E' are rollers journaled to the rocker-arms *e e*. *e' e'* are cams attached to the end of rock-shaft D, outside the side piece, A. Each side piece, A, is provided with a bearing-block, $e^2$, in proper position for engagement with the cams *e' e'*, to support the lower ends of the vibrating arms and the outer elevator-belt at a proper distance from the inner belt, as will be hereinafter fully explained. The shorter radii of the cams rest upon the block when the parts are in the position shown in Fig. 1.

F is a crank-arm rigidly attached to the rock-shaft, and connected by link *f* with a hand-lever, $E^2$, which is pivoted to the main frame at *f'*, within convenient reach of the driver while riding in his seat. The upper end of the hand-lever takes into notches $f^2$ in the horizontal bar $F^2$, or is otherwise secured in any position where it may be placed.

The devices just described may be operated as follows: When the parts are in the position shown in Fig. 1 it will be seen that the two elevating-aprons are substantially parallel to each other from the top to the bottom. Suppose that the machine cuts tangled grain, which is thrown upon the carrier in rear of the cutters in an irregularly-shaped mass of such shape that it would be difficult for it to pass between the belts *b b'* of duplex elevators while they (the belts) remain in the position shown in Fig. 1, or even through the throat between the lower end of belt *b* and the carrier in rear of the cutters, which, in this figure, is represented by an endless belt or apron, J. (Shown in dotted lines.) Now, it is apparent that if the driver moves the rollers E E' from the position shown in Fig. 1 to that shown in Fig. 2 he has widened materially the throat or passage-way between the carrier and the lower end of the delivery-belt of the elevator, and thus greatly facilitated the delivery of the irregularly-shaped mass of straw to the elevator.

It will also be seen that although the distance between the lower face of the roller E' and the upper roller, B, in Fig. 2 is much less than the distance between roller E' and roller B in Fig. 1, the belt will not be materially loosened, because the placing of rollers E E' in a position substantially at right angles to a line drawn from the upper to the lower rollers of belt *b'* has taken up the slack which would have been produced by simply shortening the distance between the upper and lower rollers of belt *b*.

It will also be seen that the parallelism between belts *b b'* has been preserved by the action of cams *e'*, the longer radius of which now rests upon bearing-block $e^2$.

The throw of the cams—that is, the difference between their longer and shorter radii—is so related to the distance between the center of rock-shaft D and that portion of roller E' which is nearest to the belt *b'* that as the hand-lever is shifted from the position shown in Fig. 1 to that in Fig. 2 the cam will move the rock-shaft from the belt *b'* at such a rate as shall be required to substantially maintain the parallelism between the elevator-belts.

Instead of cams *e' e'*, I may employ short arms $e^3$, Fig. 6, at each end of the rock-shaft, for moving it away from the inner belt, the ends of the arms $e^3$ resting upon pins $e^4$, the arms being of proper length to move the shaft the proper distance; or, instead of the hand-lever $E^2$ and link *f*, the crank-arm may be secured in the position desired by pins passing through it, or by a staple, $a^3$, the legs of which pass on both sides of it, and enter holes in the side piece, A, (see Fig. 4;) but I prefer the construction shown in Fig. 1.

It will be understood that in case the bars C C' be pivoted far enough below the center of the roller B, but not below the rock-shaft D, the moving of the rollers E E' from their position in Fig. 1 to that in Fig. 2 will result in slightly loosening the belt *b;* and to guard against this undesirable result I propose to employ a radius-link, *g*, at each end of the rock-shaft, said links being pivoted to the side bar, as indicated at *g'*, Fig. 2, in such relation to a line intersecting the center of the rock-shaft and the upper roller, B, as to keep the belt *b* taut under its various adjustments, slotting the upper ends of the bars C C' to permit the required freedom of movement of parts.

In Fig. 5 I have shown my invention adapted for loading hay or loose grain. In this figure the elevator is mounted upon the same wheels, H, with the rake-teeth H', with its lower end in such proximity to the teeth as will insure that it shall readily engage with and elevate the hay or grain which is collected by the rake-teeth. In this figure the upper end of the elevator is adjustably supported upon standards *h h* in such manner that it can be raised or lowered, as may be required, to facilitate loading the hay or grain upon the wagon.

While I have shown in Fig. 5 only one form of raking or gathering machines for collecting the cut grain or grass, I do not wish to be limited thereby, it being evident that my elevator is capable of being used with many other constructions without materially changing the scope of my invention.

It will be seen that in Figs. 1, 2, 3, 4, 5, and 6 a roller which supports the lower end of the upper elevator-belt may be moved toward or from the inclined plane of the upper edge of the elevator-frame by mechanism at the will of the operator, and may be locked in any position to which it may be adjusted, thus permitting the driver to use both hands to drive his team or for handling or manipulating the machine.

In Figs. 7 and 8 I have shown a modification of the device for changing the position of the lower end of the upper or outer elevator-belt. In these figures, I I' are bars arranged to slide endwise in suitable brackets or other fastenings (represented by $i'$ $i'$) on the inner sides of both of the side boards or side pieces of the elevator-frame.

K K' are rollers journaled in the lower ends of the bars I I' to support the lower end of the outer belt, $b$, of the duplex elevator.

L is a cog-wheel mounted on a shaft, $l$, and taking into cogged racks $i^2$ $i^3$, attached to or formed with the sliding bars I I'.

It will be understood that this shaft $l$ extends across the elevator and is journaled in the side pieces. A crank-arm is attached to one end of shaft $l$, outside the elevator, as indicated at $l'$, and may be secured in the desired position by means of pins in the side pieces, by a ratcheted wheel and pawl affixed to the shaft, or otherwise.

$b$ represents the inner elevator-belt, and J represents the horizontal carrier in rear of the cutters. $I^2$ $I^2$ are ribs attached to the side pieces, forming extensions of the bars I I' to support the edges of the elevator-belt; but these may not be essential.

It will be seen that by means of the shaft $l$, cog-wheel L, and racks $i^2$ $i^3$ the bars I I' and rollers K K' can be shifted from the position shown in Fig. 7 to that shown in Fig. 8, thereby increasing the distance between the lower end of the belt $b$ and the upper surface of the carrier J, substantially as is done by the devices shown in Figs. 1, 2, 3, 4, 6, and facilitating the passage of large masses of grain and hay from the carrier to the elevator.

The racks $i^2$ $i^3$ and cogged wheel L may be dispensed with, the bars I I' having bolts passing through them and working in slots in the sides A of the elevator-frame, whereby the said bars and belt-rollers at their lower ends may be adjusted to the desired position by hand, and then secured by tightening the nuts on the outer ends of the bolts.

Suitable guiding-blocks, cleats, or other equivalent devices should be used on the inner faces of the elevator-frame to properly guide the bars I I' during their reciprocations.

In Figs. 10 and 11, which show other modifications, the lower belt-roller, M, is mounted in the lower end of bars $m$, which slide vertically within the elevator-frame and are secured at various heights by bolting to the sides A, or otherwise, to increase the distance between the lower end of belt $b$ and the upper surface of the carrier, a tightening-roller, N, being mounted in bearing blocks or boxes, which are supported between cleats $n'$ $n'$ or in ways, so as to be capable of being adjusted on a line substantially at right angles to the path traveled by the belt $b$, for the purpose of taking up the slack when the roller M is raised, as will be readily understood without further explanation.

In Fig. 12 I have shown four rollers, one of which, O, is stationary at the upper end of the elevator-frame. The lower one, O', is made adjustable vertically by means of sliding bars, boxes, or their equivalents.

The rollers $O^2$ $O^3$ are made adjustable at substantially right angles to the elevator-frame, the roller $O^2$ serving as a tightener simply, while roller $O^3$ may be adjusted whenever the operator desires to change in any manner the shape or proportions of the throat which is formed between that part of the belt $b$ which lies between rollers O' $O^3$ and the carrier-belt.

In Fig. 9 I have shown four rollers, P P' $P^2$ $P^3$, one of which, P, is stationary at or near the upper end of the elevator, all the others being adjustable up and down to change the size or form, or both, of the throat. For instance, by raising rollers $P^2$ $P^3$ the throat may be made more flaring than it is shown in the drawings; or it may be made less flaring by lowering the rollers; or the lower roller, P', and the upper one, $P^3$, may be raised without changing the position of the others; or the rollers P' $P^2$ $P^3$ may all be raised or lowered, thus changing not only the distance between the roller P' and the carrier, but also the form of the throat.

It will be seen that each and all of the above-described devices embody some features of construction and operation in common. For instance, in each of them I employ one or more rollers as tighteners, arranged within the belt $b$. Again, in each of them I can move the lower roller of belt $b$ toward the upper roller of the same belt, for the purpose of increasing the throat or space between the lower end of belt $b$ and the upper surface of the carrier. Again, in each of them I can change the shape of the throat by means of a movable roller.

I propose to use any desired construction of elevator in which the upper surface is composed in whole or in part of an endless belt, chain, or canvas under such an arrangement that by means of the combination of elements shown by me the size or shape, or both, of the space or throat between the lower end of the upper elevator-surface and the horizontal carrier may be changed, as herein explained, and without changing the position of the upper roller; but there are some advantages incident to employment of an upper elevator-surface thus constructed in combination with a lower elevator-surface consisting of an endless moving belt.

Wherever in this patent the words "carrying-surfaces of the elevator-belt" are used they mean that portion of the surface of the belt which, when the elevator is in operation, is in actual contact with the hay or grain which is being elevated or is moving toward the adjacent belt or the second member of the duplex elevator, or toward the upper rollers of the elevator, as distinguished from that portion of the belt which is moving from the upper end of the elevator or from the adjacent belt or other member of the duplex elevator; and wherever in this patent the words "lower elevator-surface" are used they mean the lower elevator-belt, $b'$, or its equivalent, whether it be a stationary table or a slotted surface, or whatever may be substituted for said lower belt to serve in conjunction with the upper belt, $b$, or its equivalent, in elevating the grain.

Instead of the endless elevating-belts which I have shown, I propose under some circumstances to use a stationary grain-supporting surface or inclined table, over which the grain is moved by means of narrow belts having transverse bars attached thereto, which modification may be made without departing from the spirit of that part of my invention which consists in moving the lower end of the upper grain-carrying surface toward the upper end of the elevator-frame for the purpose of exposing more of the lower end of the lower grain-supporting or grain-carrying surface in order to facilitate the elevating of the grain or hay.

It will, of course, be understood that I propose to use any of the forms of elevator herein shown in connection with the hay-elevator represented in Fig. 5, and that I propose to use any usual or approved or suitable construction of driving gear or belts to communicate motion from the wheel H to the elevator-belts.

In Fig. 1 I have shown, in connection with my improved elevator, a grain-binding attachment like that shown in an application for patent filed by C. W. Levalley; but as that binding attachment forms no part of this invention, it need not be described in detail, nor any specific reference made thereto.

It will be seen that in all the constructions which I have shown whereby the lower portion of the belt $b$ is capable of moving outward from the lower belt such movement is effected without changing the position of that portion of the elevator-frame which is adjacent to the said belt $b$, the lower supporting-roller being movable relatively to the elevator-frame. Each side piece of said frame may therefore be made of a single piece of board or plank.

I do not in this case claim the combination of a horizontal carrier, a lower elevator-surface, and an upper elevator-surface consisting of an endless belt supported at its upper end upon a roller and at its lower end upon two rollers; nor do I claim anything except the specific inventions embodied in the claims herein, as I prefer to claim all other patentable features in another application, which I propose to file immediately.

What I claim is—

1. In a hay or grain elevator, the combination, substantially as herein set forth, of the following elements, viz: a lower elevator-surface, an upper grain-carrying belt supported at its lower end upon a horizontal roller, which is capable of being moved toward or from the roller which supports the upper end of the same belt at the will of the operator, and mechanism adapted to tighten said upper belt when its lower supporting-roller is moved without changing the length of the belt, substantially as set forth.

2. In a hay or grain elevator, the combination, with a lower endless belt, of an upper endless belt, a horizontal roller supporting the upper end of the upper belt, a horizontal roller supporting the lower end of the upper belt and adapted to move toward and from the upper roller of said belt, and a tightening-roller arranged within the belt, substantially as set forth.

3. In a hay or grain elevator, the combination, with a lower elevator-surface, of an upper endless belt, a horizontal roller which supports the upper end of the belt, and two rollers arranged within the lower end of the belt and mounted upon arms which vibrate about a movable center, substantially as set forth.

4. In a hay or grain elevator, the combination, with an elevator-belt, of the rollers E E', mounted upon vibrating arms, the shaft D, supported in the lower ends of the vibrating links C C', and mechanism for adjusting the rollers, substantially as set forth.

5. In combination with the elevator-belt $b$ and roller B, the links C C', rollers E E', shaft D, levers $E^2$ F, and link $f$, substantially as set forth.

6. In combination with the elevator-belt $b$ and roller B, the links C C', rollers E E', shaft D, levers $E^2$ F, link $f$, and notched bar $F^2$, substantially as set forth.

7. The combination, with the elevator-belt $b$ and roller B, of the links C C', rollers E E', shaft D, levers $E^2$ F, link $f$, cam $e'$, and bearing-block $e^2$, substantially as set forth.

8. A hay or grain elevator having a lower elevator-surface, in combination with an upper elevating-belt and mechanism which deflects the lower end of the carrying-surface of said belt from the lower elevator-surface at the will of the operator, while the remaining portion of the carrying-surface of the belt remains substantially parallel with the lower elevator-surface, substantially as set forth.

In testimony that I claim the foregoing as my own I affix my signature in presence of two witnesses.

ERASMUS M. DEANE. [L. S.]

Witnesses:
C. W. LEVALLEY,
H. H. DOUBLEDAY.